United States Patent [19]

Shinto et al.

[11] Patent Number: 4,920,821
[45] Date of Patent: May 1, 1990

[54] STEERING WHEEL FOR VEHICLE

[75] Inventors: Hiroaki Shinto; Syuji Nakamura; Terumoto Yamaguchi; Tomoji Oguri; Tuneo Terashima, all of Aichi, Japan

[73] Assignees: Kabushiki Kaishma Tokai-Rika-Denki-Seisakusho, Aichi; Toyota Jidosha Kabushiki Kaisha, Toyota, both of Japan

[21] Appl. No.: 820,147

[22] Filed: Jan. 21, 1986

[30] Foreign Application Priority Data

Jan. 22, 1985 [JP] Japan ................. 60-6881[U]

[51] Int. Cl.$^5$ .............................................. G05G 1/10
[52] U.S. Cl. .................................................... 74/552
[58] Field of Search ................. 74/552, 492; 403/359, 403/269, 267, 265; 29/159 B, 159.3; 188/371, 377; 280/777, 775; 164/98

[56] References Cited

U.S. PATENT DOCUMENTS

| | | | |
|---|---|---|---|
| 1,569,888 | 1/1926 | Sheller | 74/552 |
| 1,645,446 | 10/1927 | Nellis et al. | 74/552 |
| 1,720,142 | 7/1929 | O'Connor | 74/552 |
| 1,723,004 | 8/1929 | Beck | 74/552 |
| 1,819,707 | 8/1931 | German . | |
| 1,858,650 | 5/1932 | Weida | 74/552 |
| 1,943,545 | 1/1934 | Mitchell | 74/552 |
| 2,193,223 | 3/1940 | Chayne et al. . | |
| 2,193,639 | 3/1946 | Mueller . | |
| 2,552,083 | 5/1951 | Bartsch . | |
| 2,765,674 | 10/1956 | Robards . | |
| 2,894,413 | 7/1959 | Schmid . | |
| 3,055,231 | 9/1962 | Daniel . | |
| 3,237,480 | 3/1966 | Phelon | 74/552 X |
| 3,683,717 | 8/1972 | Wilfert et al. | 74/552 |
| 3,686,969 | 8/1972 | Siepmann, Sr. . | |
| 3,714,844 | 2/1973 | Tsuda | 74/552 |
| 3,893,349 | 7/1975 | Stent . | |
| 3,938,404 | 2/1976 | Murase et al. | 74/552 X |
| 3,948,118 | 4/1976 | Garbin | 74/552 |
| 3,977,271 | 8/1976 | Becker | 74/552 |
| 3,992,041 | 11/1976 | Vernocchi . | |
| 4,044,624 | 8/1977 | Dekker . | |
| 4,116,087 | 9/1978 | Zeller . | |
| 4,241,620 | 12/1980 | Pichl et al. | 74/573 R |
| 4,313,249 | 2/1982 | Douthwaite | 164/98 X |
| 4,386,538 | 6/1983 | Van Wicklin et al. | 74/552 |
| 4,390,193 | 6/1983 | Strahan et al. . | |
| 4,448,091 | 5/1984 | Bauer et al. | 29/159 B X |

FOREIGN PATENT DOCUMENTS

| | | |
|---|---|---|
| 29616 | 6/1981 | European Pat. Off. ............. 74/552 |
| 344218 | 11/1921 | Fed. Rep. of Germany . |
| 2307438 | 9/1973 | Fed. Rep. of Germany ........ 74/552 |
| 2459246 | 6/1976 | Fed. Rep. of Germany ........ 74/492 |
| 3426684 | 1/1985 | Fed. Rep. of Germany ........ 74/552 |
| 3425959 | 1/1986 | Fed. Rep. of Germany ........ 74/552 |
| 54-12688 | 5/1979 | Japan . |
| 58-42231 | 9/1983 | Japan . |
| 58-202161 | 11/1983 | Japan . |
| 13719 | 5/1914 | United Kingdom ................. 74/552 |
| 181926 | 6/1922 | United Kingdom ................. 74/552 |
| 2089305 | 6/1922 | United Kingdom ................. 74/552 |
| 294034 | 7/1928 | United Kingdom ................. 74/552 |
| 341185 | 1/1931 | United Kingdom ................. 74/552 |
| 1360025 | 7/1974 | United Kingdom ................. 74/552 |
| 2022764 | 12/1979 | United Kingdom ............... 188/371 |
| 2058694 | 4/1981 | United Kingdom ................. 74/552 |

Primary Examiner—Rodney M. Lindsey
Attorney, Agent, or Firm—Sixbey, Friedman, Leedom & Ferguson

[57] ABSTRACT

A steering wheel for a vehicle includes spokes made of a flexible casing alloy by a molding process so that they integrally connect a boss and a steering wheel rim. Accordingly, the production of the steering wheel is facilitated.

8 Claims, 2 Drawing Sheets

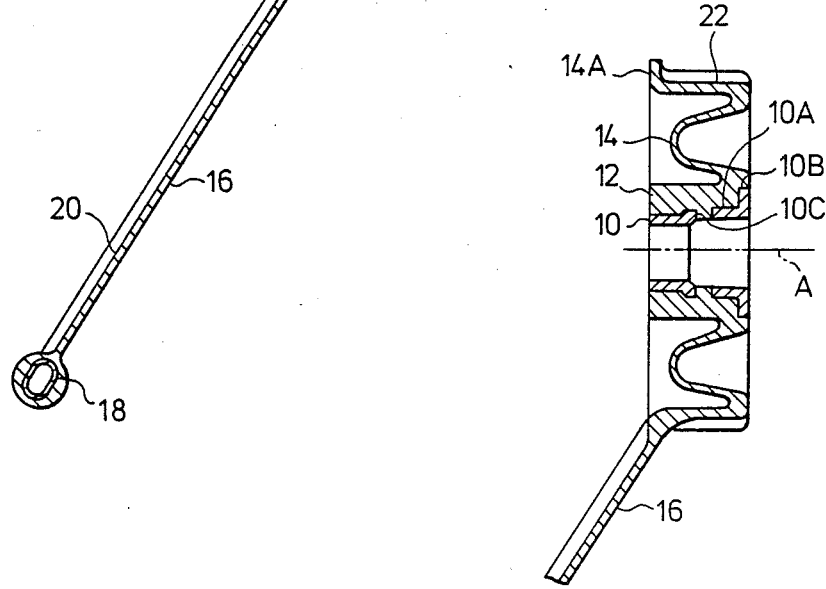

STEERING WHEEL FOR VEHICLE

BACKGROUND OF THE INVENTION

1. Field of the Invention

The present invention relates to a steering wheel for steering a vehicle.

2. Description of the Related Art

A typical conventional steering wheel for a vehicle has heretofore been arranged such that spokes extend radially from a boss which is secured to a steering shaft, and a steering wheel rim is secured to the respective distal ends of the spokes so that the driver grips the rim when steering the vehicle.

In this type of conventional steering wheel, both ends of each of the spokes are respectively welded to the boss and the rim, which involves a disadvantageously large number of portions which need to be welded and hence leads to an increase in the production cost. One type of conventional steering wheel is provided at a position thereon with a member for absorbing the kinetic energy generated when the driver's body hits the steering wheel. However, the structure of this energy absorbing member is complicated, and this involves a troublesome machining or working operation which also leads to an increase in the production cost.

SUMMARY OF THE INVENTION

In view of the above circumstances, it is a primary object of the present invention to provide a steering wheel so designed that the number of required welding steps is reduced, and the manufacture thereof is facilitated even when the steering wheel has an energy absorbing member, thereby allowing the production cost to be reduced.

To this end, the present invention provides a steering wheel in which spokes are made of a flexible casting alloy by a molding process so that the spokes integrally connect the boss and the rim, the spokes being provided with an annular energy absorbing portion which surrounds the axis of the steering shaft, the energy absorbing portion having a substantially U-shaped cross-section as viewed in a direction orthogonal to the axis of the steering shaft.

By virtue of this arrangement, it is possible to easily produce the steering wheel by inserting the boss and the rim into a molding tool, and effecting insert molding, and the energy absorbing portion can be produced at the same time.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which:

FIG. 2 is a sectional view taken along the line II—II of FIG. 1; and

FIG. 3 is a sectional view corresponding to FIG. 2, which shows a second embodiment of the steering wheel according to the present invention.

DESCRIPTION OF THE PREFERRED EMBODIMENTS

Figure 1:
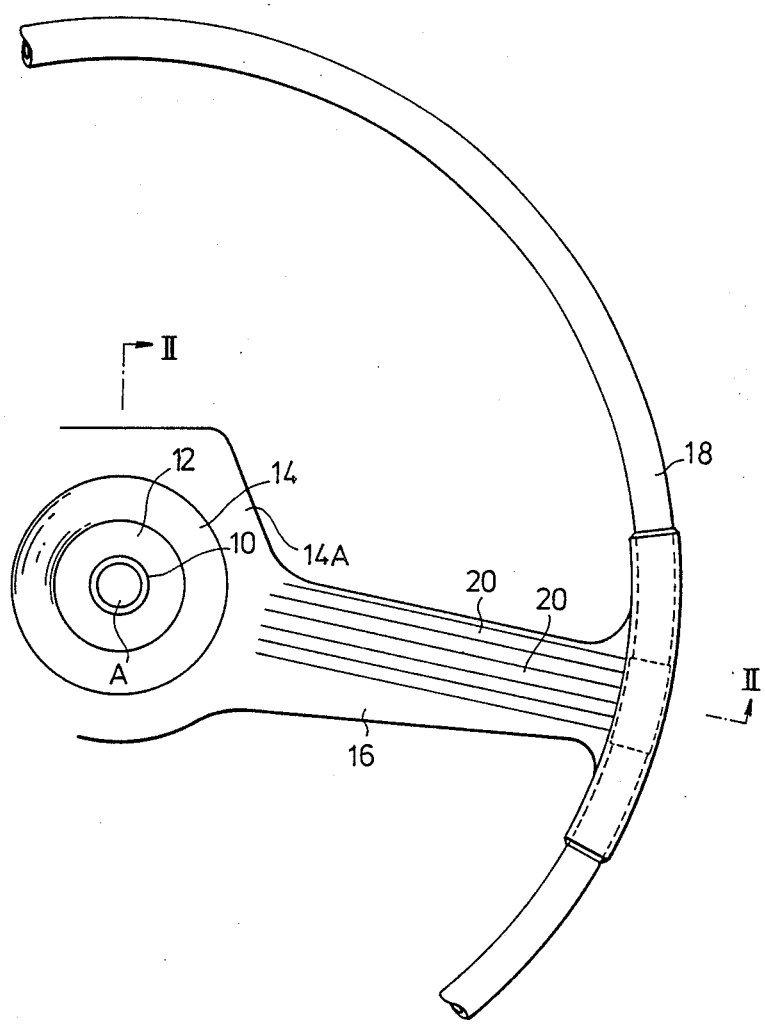
FIG. 1 is a front elevational view of a first embodiment of the steering wheel according to the present invention.

FIGS. 1 and 2 are respectively a front elevational view and a sectional view of one embodiment of the steering wheel according to the present invention.

A boss 10 is formed into a cylindrical configuration by, for example, cold forging, and is secured to the distal end portion of a steering shaft (not shown) coaxially with respect to the axis A of the shaft.

The boss 10 is so shaped that the outer peripheral portion thereof at its distal end, that is, on the side thereof which is closer to the driver, has the smallest outer diameter. The boss 10 is provided at an intermediate position thereon with a taper portion 10A the outer diameter of which gradually increases. A rib 10B is provided on the taper portion 10A in such a manner as to project radially from the distal or lower end of the taper portion 10A. The taper portion 10A is provided with a plurality of through-holes 10C extending therethrough radially of the steering shaft. When a spoke hub 12 is molded, the hub 12 partially enters the through-holes 10C so that it is secured to the outer periphery of the boss 10.

The spoke hub 12 has an outer diameter substantially equal to that of the rib 10B. The inner end of an energy absorbing portion 14 is integrally connected to the end portion of the spoke hub 12 on the side thereof which is closer to the driver. The energy absorbing portion 14 is, as shown in FIG. 2, bent such as to have a U-shaped cross-section as viewed in a direction orthogonal with respect to the axis A of the steering shaft, the curve of the bent portion facing away from the driver. This U-shaped portion has a continuous and annular structure which surrounds the steering shaft as viewed in the axial direction of the steering shaft, as shown in FIG. 1. The energy absorbing portion 14 is formed such as to have a predetermined thickness in accordance with the required energy absorbing characteristic.

The outer end of the energy absorbing portion 14 is bent in the radial direction of the steering shaft so as to provide a thick-walled portion 14A. The inner end of a spoke 16 is integrally connected to the thick-walled portion 14A. The distal or outer end of the spoke 16 covers a portion of a rim 18 so that the rim 18 is disposed coaxially with the steering shaft. In this embodiment, two spokes 16 project radially from the boss 10.

The spoke hub 12, the energy absorbing portion 14 and the spokes 16 are integrally molded from a casting alloy, e.g., an aluminum-based alloy or a magnesium-based alloy. Thus, the boss 10 and the rim 18 are connected by means of this integrally molded structure.

Grooves 20 may be longitudinally formed in the surface of each spoke 16 for the purpose of adjusting the strength thereof. Further, the arrangement may be such that a core bar for each spoke 16 is previously disposed with one end thereof secured to the rim 18, and the spoke 16 is then formed around the outer periphery of the core bar by a molding process, whereby the strength of the spoke 16 can be adjusted.

The steering wheel in accordance with this embodiment thus arranged is produced in the following manner. The boss 10 and the rim 18 are first inserted into a molding tool, and an aluminum-based alloy (in the case of this embodiment) is injected into the molding tool. In consequence, the aluminum-based alloy forms an integrally molded structure in which the outer periphery of the boss 10, the spoke hub 12, the energy absorbing portion 14, the spokes 16 and some outer peripheral portions of the rim 18 are integrally secured together, and the steering wheel is thereby produced. Thus, the steering wheel in accordance with this embodiment is produced simply by effecting molding using an aluminum-based alloy, which considerably facilitates the manufacture of the steering wheel.

In actual use of this steering wheel, the steering force applied to the rim 18 is reliably transmitted to the steering wheel by the spokes 16 and the energy absorbing portion 14 through the boss 10.

When the driver's body applies an impact force to the rim 18 in an emergency situation of the vehicle, the energy absorbing portion 14 is deformed, and the force of impact is thereby absorbed, thus allowing levels of damage to be lowered. In this way, the energy absorbing portion 14 serves as a deformable portion.

Referring next to FIG. 3, there is shown a second embodiment of the steering wheel according to the present invention. In this embodiment, the energy absorbing portion 14 is disposed in such a manner that the curve thereof faces the driver, that is, the direction opposite to that in the first embodiment. The inner end of the energy absorbing portion 14 is integrally secured to the end portion of the spoke hub 12 on the side thereof which is closer to the front end of the vehicle, while the outer end thereof is connected to the inner end of a thin-walled tubular portion 22 on the side thereof which is closer to the front end of the vehicle. The end of the tubular portion 22 on the side thereof which is closer to the rear end of the vehicle, that is, closer to the driver, is integrally connected to the inner end of the thick-walled portion 14A. The arrangement of the other portions of the second embodiment is similar to that of the first embodiment, and the second embodiment offers advantages similar to those offered by the first embodiment.

Accordingly, in this embodiment, when the driver's body hits the rim 18 in an emergency situation of the vehicle and an impact load is consequently applied to the rim 18, the energy absorbing portion 14 can move toward the front end of the vehicle by a distance twice as much as the height of the U-shaped bent portion. It is therefore possible to obtain a larger energy absorbing stroke than that in the case of the first embodiment. In addition, since the inner end of the energy absorbing portion 14 in this embodiment is secured to the end portion of the spoke hub 12 on the side thereof which is closer to the front end of the vehicle, when the energy absorbing portion 14 is deformed, force acts in a direction in which the diameter of the spoke hub 12 descreases, and this increases the rigidity of the bond between the spoke hub 12 and the boss 10.

It is to be noted that it is possible to control the absorption of any impact load and adjust the amount of kinetic energy which it is intended should be absorbed by providing slits, through-holes and the like in the energy absorbing portion 14 in the above embodiments, or shaping the portion 14 in the form of mesh, according to need. Further, the cross-sectional configuration of the energy absorbing portion 14 is not necessarily limited to the shape of a U as in the above embodiments, and any desired configuration may be employed. For example, the energy absorbing portion 14 may be bent such as to have an S-shaped cross-section, or may be corrugated.

As has been described above, the steering wheel according to the present invention includes spokes which are made of a flexible aluminum-based alloy by a molding process so that the spokes integrally connect the boss and the rim, and an annular energy absorbing portion is formed on the spokes such as to surround the axis of the steering shaft, the energy absorbing portion having a substantially U-shaped cross-section as viewed in a direction orthogonal with respect to the axis of the steering shaft. It is therefore possible to facilitate the production of the steering wheel and reduce the production cost thereof.

What is claimed is:

1. A steering wheel for a vehicle comprising:
   a. a cylindrical boss for securing said steering wheel to the distal end of a steering shaft provided on the vehicle;
   b. a steering wheel rim, and
   c. a one piece structure made of a casting alloy by a molding process, said structure being cast about to integrally connect said boss and said steering wheel rim, said structure comprising:
      1. flexible spokes cast about said steering wheel rim;
      2. a spoke hub formed at an inner center portion of said spokes and being cast about said boss, and
      3. an annular energy absorbing portion connecting said spokes to said spoke hub so as to coaxially surround the axis of said steering shaft and said boss through said spoke hub, and wherein said energy absorbing portion includes at least one bend, an end of which is connected to a thick walled portion of the energy absorbing portion, the inner ends of the spokes being connected to the thick walled portion.

2. A steering wheel according to claim 1, wherein said spokes, said spoke hub and said annular energy absorbing portion are integrally molded from one moldable alloy from the group consisting of an aluminum-based alloy and a magnesium-based alloy.

3. A steering wheel according to claim 1, wherein said energy absorbing portion is bent such as to have a substantially U-shaped cross section as viewed in a direction orthogonal with respect to the axis of said steering shaft, the curve of said bend facing away from the driver.

4. A steering wheel according to claim 3, wherein said boss is so shaped that the end portion of said boss on the side thereof which is closer to the distal end of said steering shaft when extending therethrough has the smallest outer diameter, and a taper portion is formed at an intermediate position thereon, the outer diameter of which taper portion gradually increases, said boss further having a rib projecting radially from the distal or lower end of said taper portion.

5. A steering wheel according to claim 4, wherein said taper portion has a plurality of throughholes extending therethrough in the radial direction of said steering shaft, and said spoke hub partially enters said through-holes, whereby said spokes are secured to the outer periphery of said boss.

6. A steering wheel according to claim 1, wherein said energy absorbing portion is bent such as to have a substantially W-shaped cross-section as viewed in a direction orthogonal with respect to the axis of said steering shaft, a curve of said bend facing the driver.

7. A steering wheel according to claim 6, wherein said boss is so shaped that the end portion of said boss on the side thereof which is closer to the distal end of said steering shaft when extending therethrough has the smallest outer diameter, and a taper portion is formed at an intermediate portion thereon, the outer diameter of which taper portion gradually increases, said boss further having a rib projecting radially from a distal or lower end of said taper portion.

8. A steering wheel according to claim 7, wherein said taper portion has a plurality of throughholes extending therethrough in the radial direction of said steering shaft, and said spoke hub partially enters said through-holes, whereby said spokes are secured to the outer periphery of said boss.

* * * * *